US008484367B2

(12) United States Patent
Mace et al.

(10) Patent No.: US 8,484,367 B2
(45) Date of Patent: Jul. 9, 2013

(54) NETWORK DATA STORAGE SYSTEM

(75) Inventors: Gael Mace, Langan (FR); Claude Chapel, Rennes (FR); Valérie Allie, Saint Armel (FR)

(73) Assignee: Thomson Licensing, Issy-les-Moulineaux (FR)

( * ) Notice: Subject to any disclaimer, the term of this patent is extended or adjusted under 35 U.S.C. 154(b) by 976 days.

(21) Appl. No.: 11/801,376

(22) Filed: May 9, 2007

(65) Prior Publication Data
US 2009/0019054 A1 Jan. 15, 2009

(30) Foreign Application Priority Data

May 16, 2006 (EP) ..................................... 06290792

(51) Int. Cl.
G06F 15/16 (2006.01)
G06F 15/173 (2006.01)
H04N 7/16 (2011.01)

(52) U.S. Cl.
USPC ........... 709/231; 709/201; 709/217; 709/219; 709/223; 709/226; 725/143; 725/144; 725/145

(58) Field of Classification Search
USPC ................... 709/213, 214, 215, 216, 201, 13, 709/217, 219, 230–235; 711/111, 112, 114; 726/114–116, 143–146
See application file for complete search history.

(56) References Cited

U.S. PATENT DOCUMENTS

| 6,721,794 | B2 * | 4/2004 | Taylor et al. | 709/231 |
| 6,839,740 | B1 * | 1/2005 | Kiselev | 709/214 |
| 6,862,609 | B2 * | 3/2005 | Merkey | 709/214 |
| 6,880,062 | B1 * | 4/2005 | Ibrahim et al. | 711/202 |
| 6,901,491 | B2 * | 5/2005 | Kohn et al. | 711/157 |
| 7,428,540 | B1 * | 9/2008 | Coates et al. | 1/1 |
| 7,506,034 | B2 * | 3/2009 | Coates et al. | 709/219 |
| 7,509,645 | B2 * | 3/2009 | Coates et al. | 718/105 |
| 7,774,325 | B2 * | 8/2010 | Coates et al. | 707/704 |
| 7,774,466 | B2 * | 8/2010 | Coates et al. | 709/226 |
| 7,831,641 | B2 * | 11/2010 | Wong et al. | 707/822 |
| 8,195,760 | B2 * | 6/2012 | Lacapra et al. | 709/214 |
| 8,195,769 | B2 * | 6/2012 | Miloushev et al. | 709/219 |
| 2002/0120763 | A1 * | 8/2002 | Miloushev et al. | 709/230 |

(Continued)

FOREIGN PATENT DOCUMENTS

WO WO 02/056181 A2 7/2002
WO WO 02/061525 A2 8/2002

OTHER PUBLICATIONS

European Search Report.

*Primary Examiner* — Tae Kim
(74) *Attorney, Agent, or Firm* — Myers Wolin, LLC

(57) ABSTRACT

The inventions concerns a network data storage system comprising a storage unit, at least one network client and an intermediate network switch.

The storage unit contains at least two data storage servers each comprises a local storage component containing digital file segments of at least one digital file and is adapted to execute a local digital file management method organizing the physical location of the digital file segments.

Each data storage server is adapted to communicate with the other data storage servers and to execute a distributed digital file management method.

The distributed digital file management method maintains a record of operations and communicates internally with the other data storage servers to obtain information concerning the digital file segments contained on the other data storage servers and an overview of all information concerning all digital files stored on the storage unit.

15 Claims, 3 Drawing Sheets

U.S. PATENT DOCUMENTS

| | | |
|---|---|---|
| 2002/0157113 A1* | 10/2002 | Allegrezza .................... 725/115 |
| 2003/0140051 A1 | 7/2003 | Fujiwara et al. |
| 2003/0145086 A1 | 7/2003 | O'Reilly |
| 2004/0078465 A1* | 4/2004 | Coates et al. ................ 709/226 |
| 2004/0078466 A1 | 4/2004 | Coates et al. |
| 2004/0133577 A1* | 7/2004 | Miloushev et al. ............. 707/10 |
| 2004/0133606 A1* | 7/2004 | Miloushev et al. ........... 707/200 |
| 2004/0133650 A1* | 7/2004 | Miloushev et al. ........... 709/213 |
| 2005/0114538 A1* | 5/2005 | Rose ............................ 709/231 |

* cited by examiner

NETWORK DATA STORAGE SYSTEM

This application claims the benefit, under 35 U.S.C. §119 of European Patent Application 06290792.8, filed May 16, 2006.

FIELD OF THE INVENTION

The invention relates to a network data storage system for communicating data with a storage unit through a digital network.

BACKGROUND OF THE INVENTION

Data stored on a storage device can be made accessible to several clients or applications connected to a network using a network storage system such as network attached storage (NAS). Network attached storage is generally implemented by connecting a NAS device to a network switch to which a certain number of clients or applications are linked.

The NAS device, often called a "server" due to the fact that it provides a service, comprises software that implements a file system or a file management method and is connected directly to the storage device. Communication with the storage device is performed through a high speed small computer system interface (SCSE) or an integrated drive electronic (IDE) link.

The digital files stored using network attached storage are visible to each client on the network and during a request for a digital file the file system retrieves sectors of data of the digital file stored in different physical locations of the storage device and communicates the complete digital file to the client.

For the client, the NAS system has a simplified administration, the client requests a digital file and the digital file is delivered as an undivided unit. However, due to the fact that multiple clients communicate with the NAS device through one communication channel that enters the NAS device, the NAS storage system develops a communication bottleneck when a large amount of data is being transferred to or from the storage device or in the presence of a large number of client requests.

Clustered storage systems such as storage area networks (SAN) remove or reduce the bottleneck developed by NAS systems. The SAN comprises a plurality of storage devices connected in parallel to a SAN switch with a client being connected directly to the SAN switch or indirectly through a server connected to the SAN switch. As the storage data is distributed amongst a plurality of storage devices, concurrent access to the shared data is increased and the risk of developing a communication bottleneck is reduced.

However, the SAN system requires a more complex distributed file system to be implemented by the client to manage data storage. The distributed file system used by the client retrieves data segments of a digital file distributed amongst several storage devices. Standard distributed file systems such as network file system (NFS) or common internet file system (CIFS) cannot be used and specialised and expensive hardware is required to implement the distributed storage functionality.

Multimedia data generally refers to data containing visual, audio, animation, graphical or text information or a combination of any of these. Multimedia data typically comprises large quantities of data bits that necessitate high bit rate communication. The transfer of the multimedia data requires data to be streamed continuously that is communicated in a linear and continuous manner. Multimedia data is currently used for example in medical applications, military applications and in the audio-visual applications of television studios.

The network storage of multimedia data differs from that of traditional information technology data in terms of storage space and access requirements. A network data storage system used in the multimedia data environment needs to support extremely large volumes of data, to provide high bandwidth and needs to give priority to linear continuous access to the stored multimedia data.

A client or application on the network that requests multimedia data requires the data to be delivered in strict temporal continuity from the storage unit. Due to the fact that the multimedia data is consumed in real time, the transfer of the multimedia data needs to be strictly respected and controlled in the time domain and a delay in the arrival of the multimedia data cannot be tolerated.

The communication bottleneck of the NAS system is problematic for multimedia data streaming and does not respect the strict temporal requirements of the multimedia data. The SAN system imposes the use of a complex distributed file system by the client to manage data storage on a plurality of storage devices.

SUMMARY OF THE INVENTION

The purpose of the invention is to provide a network data storage system that is capable of data communication that respects the strict temporal requirements of linear data communication and whose file system administration is simple for the client.

It is an object of the present invention to provide a network data storage system according to claim 1.

Other features of the interface device are found in the dependent claims.

BRIEF DESCRIPTION OF THE DRAWINGS

The above object, features and other advantages of the present invention will be best understood from the following detailed description in conjunction with the accompanying drawings, in which.

DETAILED DESCRIPTION OF PREFERRED EMBODIMENTS

Figure 1:
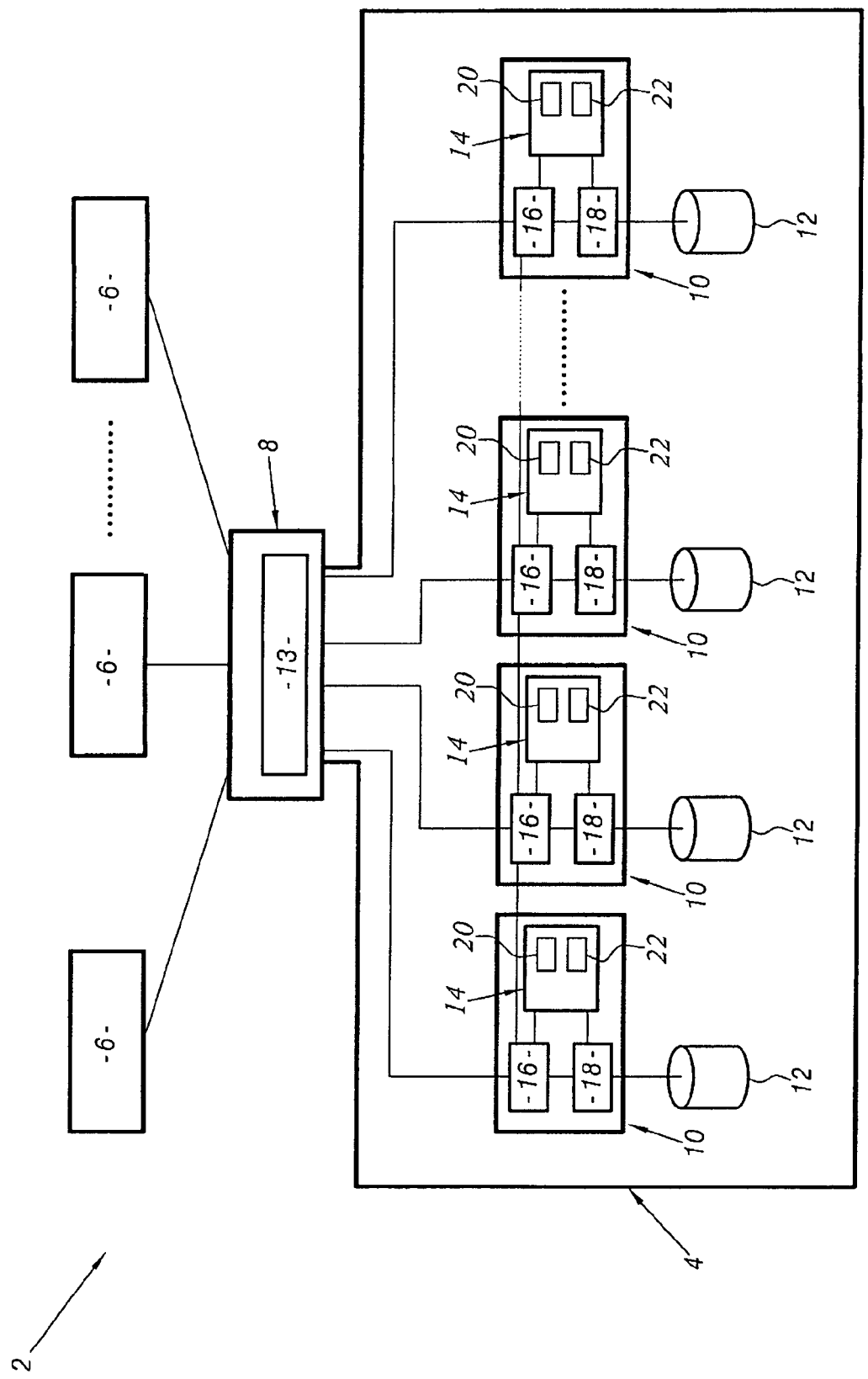
FIG. 1 is a schematic block diagram of a network data storage system according to the invention.

In the drawings, the same reference numbers are used to designate the same elements.

A network data storage system 2 for writing digital files to a storage unit 4 and reading digital files from a storage unit 4 through a digital network is illustrated in FIG. 1. In the current example the digital network is constructed using an Ethernet networking implementation. The digital files contain a sequence of bits representing binary numerical data representing information such as for example a digital video recording. The digital files have associated metadata comprising information such as the name of the digital file and the date of the last modification of the file. The network data storage system 2 comprises at least one network client or application 6 adapted to establish communication with the storage unit 4 and each network client 6 is linked to the storage unit 4 through an intermediate network switch 8.

The network client 6 is a device comprising software adapted to access remote services by communicating with other software called server software in the storage unit 4. The network client 6 is for example an audio-visual device in a live television studio retrieving stored archive data and displaying the archive data to a studio audience, the television studio being simultaneously transmitted to a live television audience.

The intermediate network switch 8 connects the network segments comprising each network client 6 and the storage unit 4 together to form the digital network. Data is transmitted in data packets on the digital network and each data packet comprises at least one navigational data portion for navigating the data through the digital network to its destination and a data payload containing the multimedia data or control data relative to the management of the network data storage system 2.

Data that is sent by the network client 6 to the intermediate network switch 8 and destined for the storage unit 4 contains a navigational data portion having a destination media access controller (MAC) address, the destination media access controller (MAC) address being an address associated with the storage unit 4 or possibly another device connected to the network. The intermediate network switch 8 is adapted to save the MAC address of the network client 6 and the port of the intermediate network switch 8 at which the data arrived in a MAC address table. The intermediate network switch 8 subsequently consults the MAC address table, routes the data to the intermediate network switch port associated with the destination MAC address and transmits the data from the port to its destination.

Data that is sent from the storage unit 4 to the network client 6 passes through the intermediate network switch 8 and is navigated through the network in a similar way. The intermediate network switch 8 is also adapted to multicast the data by routing the incoming data to all ports except the incoming data port and then transmitting the data from the ports to their associated destinations.

The storage unit 4 comprises at least two data storage servers 10 and each data storage server 10 contains a local storage component 12. In the current embodiment the local storage component is a redundant array of independent disks (RAID). In an alternative embodiment the local storage component is a hard disk drive.

Each data storage server 10 is individually connected to the intermediate network switch 8. However, a client 6 has a unique virtual entry point to the storage unit 4. The unique virtual entry point is implemented using a unique internet protocol (IP) address assigned to the storage unit 4. When a client 6 seeks to establish communication with the storage unit 4, a navigational data portion of the data packet containing an IP address is verified by the intermediate network switch 8. Upon confirmation that the IP address corresponds to that of the storage unit 4, the data is communicated to the storage unit 4.

Each data storage server 10 is additionally connected to its neighbouring storage server 10 allowing any storage server 10 to communicate with any other storage server 10 internally in the storage unit 4.

The intermediate network switch 8 also contains a load balancer 13. The load balancer 13 is adapted to manage the work load of data storage servers 10 of the storage unit 4 and presents the storage unit 4 to the clients 6 as a single unique storage device.

The load balancer 13 is adapted to transfer a client communication to one of the data storage servers 10. A predefined set of rules is used to determine which data storage server 10 will receive the communication from the client 6. In the current embodiment the predefined set of rules employed is the least number of connections to the data storage servers 10. In other embodiment of the invention, round-robin or source/destination hashing is employed. The communication is forwarded to the data storage servers 10 using a network address translation (NAT) forwarding technique. In other embodiments of the invention IP tunneling and IP direct routing is employed. The load balancer 13 is also adapted to receive and transfer a digital file communicated from the storage unit 4 to the client following a digital file reading request by the client to the storage unit 4.

The load balancer 13 contains a routing table and is adapted to maintain an up to date account of the client/data storage server 10 connections of each data storage server 10 in the routing table. The current and envisaged connections of the data storage servers 10 are maintained in the routing table as well as the envisaged terminations of client/data storage server 10 connections.

Each data storage server 10 comprises a storage server processor 14 to manage the storage and retrieval of data in the local storage component 12 of the data storage server 10, a network interface device 16 interfacing the intermediate network switch 8 and the data storage server 10 and a RAID controller 18 interfacing the network interface device 16 to the local storage component 12. The network interface device 16 additionally interfaces the data storage server 10 to the neighbouring data storage servers 10 for inter data storage server 10 communication.

The network interface device 16 contains a dedicated hardware processor adapted to process the navigational data portions of the data packets and to communicate data to and from the intermediate network switch 8, to and from the storage server processor 14, to and from the Raid controller 18 and to and from the other data storage servers 10.

The data communication to and from the storage server processor 14 comprises data payloads containing only control data relative to the management of the network data storage system 2. The data communication to and from the Raid controller 18 comprises data payloads containing only multimedia data and the data communication to and from the intermediate network switch 8 comprises data payloads containing multimedia data or control data. The data communication between data storage servers 10 comprises data payloads containing control data relative to the synchronisation and management of the data storage servers 10 of the storage unit 4.

The RAID controller 18 is implemented in dedicated hardware and comprises a control unit, a stream processor, a stripping processor and a SCSI controller. The control unit is adapted to execute the commands of the storage server processor 14 and to communicate with the stripping processor and the SCSI controller. The stream processor provides multimedia data payloads to the network interface device 16 to be transported on the digital network. The stream processor also transports multimedia data from the network interface device 16 to the stripping processor that divides the stream of data into words of 16 bits corresponding to the disk access size of the RAID disk. The two operations of the stream processor are bi-directional and simultaneous. The SCSI controller communicates with the RAID disks through a serial attached SCSI interface to write the data words of 16 bits to the RAID disks and to read data from the RAID disks. The fast response of the SCSI controller when transferring data to and from the disks optimises the data transfer speed between the storage unit 4 and the digital network. The RAID controller 18 is hardware programmed to implement a RAID level 5 organisation of the data on the RAID disks in association with the storage server processor 14.

The storage server processor 14 contains server software adapted to implement a distributed digital file management method to manage the storage and retrieval of digital files in the storage unit 4.

Following a digital file writing request, the distributed digital file management method of each data storage server 10, divides the digital file into at least two digital file segments and communicates the digital file segments to at least two data storage servers 10 for storage in the local storage component 12. For example, in the case where the storage unit 4 contains two data storage servers 10 and the digital file in divided into two segments, each data storage server 10 either receives all segments or only one segment of the digital file with each data storage server 10 receiving a different digital file segment.

The stripping of the digital file into digital file segments that are stored on several data storage servers 10 avoids data congestion on a single data storage server 10 during the communication of data to and from the storage unit 4.

The distributed digital file management method also presents the storage unit 4 to the client 6 as a unified storage entity and the internal structure of the storage unit 4 and of the existence of the data storage servers 10 and the local storage components 12 are concealed.

The digital files stored on the storage unit 4 are presented to the client as a unified storage organisation having logical sets of digital files with directories and root directories. When a client 6 requests a digital file, from the client's point of view the request is made to the unified file system of the storage unit 4 via the client's 6 unique virtual entry point to the storage unit 4 and the client 6 receives the digital file as an undivided entity from the unified file system of the storage unit 4 via the unique virtual entry point of the storage unit 4.

The storage server processor 14 of each data storage server 10 contains a storage management table 20 that the distributed digital file management method maintains updated. The storage management table 20 contains information concerning operations performed by the data storage server 10 such as the writing or modification of digital file segments on the data storage server 10. The storage management table 20 contains information relative to the digital file segments of the data storage server 10 in which it is incorporated and also contains information relative to the digital file segments contained in all the other data storage servers 10 of the storage unit 4.

Following an operation such as the writing or modification of digital file segments on a data storage server 10, the concerned data storage server 10 updates its storage management table 20 and communicates the operation to all the other data storage servers 10. Each of the other data storage servers 10 subsequently updates its storage management table 20 with the new digital file segment that has been added or with the modification that has been made to an existing digital file segment for example.

Each data storage server 10 has access to each storage management table 20 of each of the other data storage servers 10 via inter data storage server 10 communication.

Each data storage server 10 has full knowledge of all the digital files stored on the storage unit 4 and the distribution of the digital file segments amongst the data storage servers 10 as well as the digital file segment writing and modification operations carried out at each data storage server 10.

The distributed digital file management method of each data storage server 10 has full knowledge of all the digital files stored on the storage unit 4 and presents a unified storage organisation having logical sets of digital files with directories and root directories to a client 6. During a digital file writing request, the distributed digital file management method uses the overview of all information concerning all digital files stored on the storage unit 4 to determine the data storage servers 10 to which it will communicate the digital file segments of the divided digital file.

The distributed digital file management method adds an entry to the storage management table 20 or modifies an existing entry of the storage management table 20 of the concerned storage server 10 during the process of writing or modifying the digital file segment in the data storage server 10.

During the process of writing or modifying a digital file segment in the data storage server 10 the distributed digital file management method blocks access to the digital file segment being written or modified. None of the other data storage servers 10 or the data storage server 10 in which the digital file segment is been written or modified can access the digital file segment to perform a transfer to a client or a modification of the digital file segment during the writing or modification process.

The distributed digital file management method also blocks access to a digital file segment that is in the process of being read, if a request to modify the digital file to which the digital file segment belongs is issued by a client 6. The distributed digital file management method does not block access to a digital file segment that is in the process of being read, if a request to read the digital file to which the digital file segment belongs is issued by a client 6. This allows multiple reading accesses by clients 6 to the stored digital files.

When one or more clients are exploring the contents of a directory that contains a digital file whose digital file segment is being modified or written, data concerning the digital file metadata for example will only be transferred when the storage management table 20 has been updated in order to maintain a simplified and unified view of the storage unit 4 for all the clients 6.

Although the distributed digital file management method can access information in the storage management tables 20 concerning the distribution of the digital file segments amongst the data storage servers 10, it does not have access to any information concerning the physical placement and organisation of the digital file segments on the local storage component 12 of the data storage server 10. The storage server processor 14 of each data storage server 10 contains software adapted to implement a local digital file management method that manages the physical placement and organisation of the digital file segments on the local storage component 12.

The RAID controller 18 prepares the file segment data for transfer to the RAID disks under the control of the storage server processor 14 and the local digital file management method manages the physical organisation of the data on the disks. Following the division of the digital file segments received by the data storage server 10 into 16-bit disk access words by the RAID controller 18, the local digital file management method organises the physical placement of the 16 bit disk access words into the disc sectors of the RAID disks of 512 byte size.

The local digital file management method keeps track of the physical location of the data in the disc sectors by updating a file segment allocation table 22 contained in the storage server processor 14. The file segment allocation table 22 is used to keep track of which sectors belong to which file segments and which sectors remain unused.

Following a digital file reading request from the client 6 the distributed digital file management method of the concerned data storage servers 10 temporally synchronise the recuperation of each digital file segment of the digital file in the correct order from the data storage server 10 to form a continuous stream of digital file segments that is transferred to the client 6 via the load balancer 13 for use in real time by the client 6.

Such synchronisation is needed as data buffering is not used due to the extremely large quantities of data contained in multimedia data that would require the client 6 to employ excessively large memory buffers and require excessive data processing by the client 6.

Figure 2A:
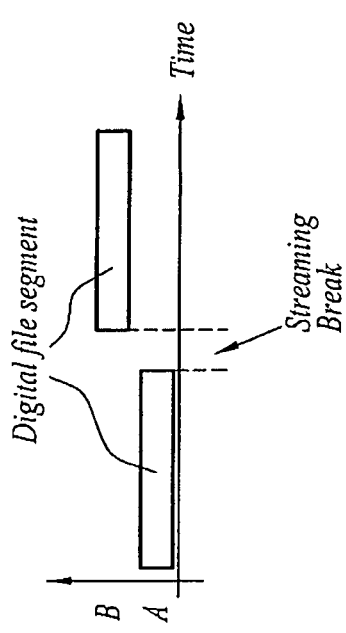
FIGS. 2A, 2B and 2C are schematic block diagram indicating the potential problems associated with the processing of data segments of a digital file in a network data storage system.
Figure 2B:
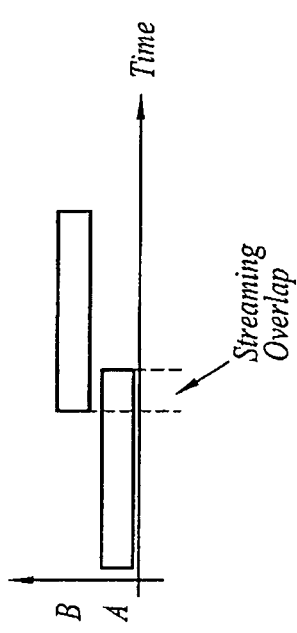
Figure 2C:
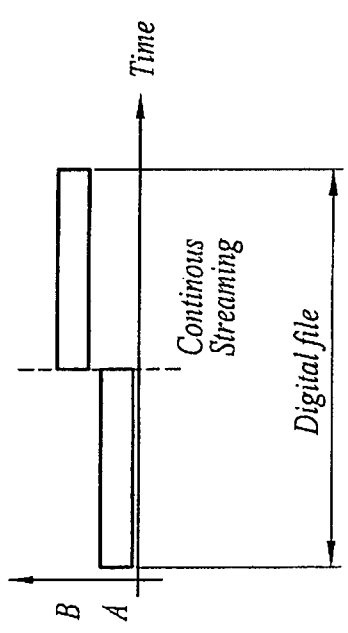

A reading request for multimedia data from the storage unit 4 requires the order of the digital file segment transfer from each data storage server 10 to be strictly respected and the digital file segments to be delivered in strict temporal continuity. FIG. 2C illustrates the ideal retrieval of a digital file, comprising a first and a second digital file segment, from the data storage server A and data storage server B respectively. The digital file retrieval is in the correct order and there is a temporal continuity between the digital file segments unlike the cases illustrated in FIGS. 2A and 2B where a break between digital file segments and an overlap between digital file segments result in a disturbance in the arrival of the multimedia data to the client.

Figure 3:
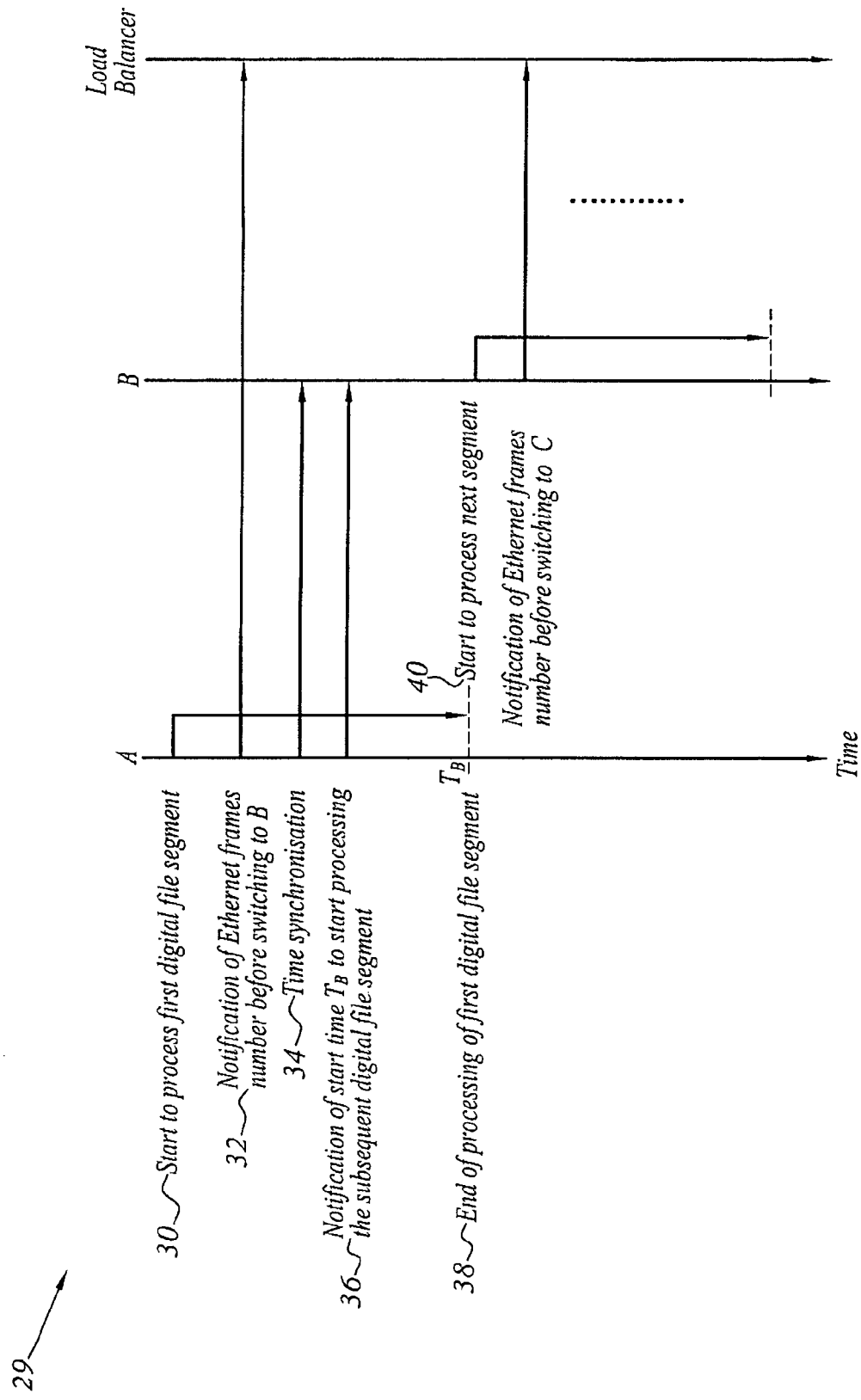
FIG. 3 is a flow chart of a method for synchronizing the processing of data segments of a digital file in the network data storage system of FIG. 1.

The distributed digital file management method carries out a synchronisation process 29, as illustrated in FIG. 3, to synchronise the processing of digital file segments of a digital file contained in multiple data storage servers 10 and to correctly deliver a digital file to the client 6.

A digital file reading request is received at any one of the data storage servers 10 (the data storage servers 10 with the smallest workload in the current embodiment) through the load balancer 13. If the receiving data storage server 10 is not the data storage server 10 containing the first digital file segment of the digital file, the receiving data storage server 10 consults its storage management table 20 in order to recuperate information concerning the placement of all the digital file segments of the digital file on the other data storage servers 10. The distributed digital file management method communicates the reading request internally to the data storage server 10 containing the first digital file segment of the digital file requested.

The distributed digital file management method of the data storage server 10 containing the first digital file segment similarly recuperates information from its storage management table 20 concerning the placement of all the digital file segments of the digital file on the other data storage servers 10. The distributed digital file management method of the data storage server 10 containing the first digital file segment then informs the other data storage servers 10 containing each of the other digital file segments that a read request has been issued and they are informed of the digital file segment that is to be transferred from their local storage component 12. The distributed digital file management method also informs the load balancer 13 that it is the data storage server 10 containing the first data segment and the load balancer 13 updates its routing table accordingly. The load balancer 13 is also informed of the data storage server 10 that will communicate the subsequent data segment.

The data storage server 10 containing the first digital file segment will start the transfer of the first digital file segment. The data storage server 10 containing the first digital file segment of the digital file (illustrated by data storage server "A" in FIG. 3) executes a first processing step 30 launching the retrieval of the first digital segment and the first digital file segment is communicated to the load balancer 13. The load balancer 13 continues the transfer of the first digital file segment to the client 6 in accordance with the information recorded in its routing table.

The data storage server 10 containing the first data segment then carries out a communication step 32 communicating to the load balancer 13 an Ethernet frame number indicating when processing will pass to a subsequent data storage server 10 (illustrated by data storage server "B" in FIG. 3) or when the retrieval of the current digital segment will end if the current data segment is the last data segment of the digital file.

A time synchronisation step 34 synchronises the clock cycles of the current data storage server 10 and the subsequent data storage server 10 containing the second digital file segment through internal communication between data storage servers 10. This ensures that the strict temporal requirements of the data transfer are adhered to during the handover from one data storage server 10 to the subsequent data storage server 10.

A notification step 36 sends a precise start time to the data storage server 10 containing the subsequent digital file segment indicating the time at which the data storage server 10 containing the subsequent digital file segment is to start communicating the next data segment to the load balancer 13 that continues the transfer of the second digital file segment to the client 6. The notification of the start time allows the data storage server 10 concerned to prepare the processing and retrieval of the subsequent digital file segment in advance of the start time so that the subsequent data storage server 10 will continue the transfer and respect the temporal continuity of the data transfer.

A termination step 38 terminates the processing of the first digital file segment precisely at the start time and a second processing step 40 is then launched in the subsequent data storage server 10 at the start time to retrieve the next digital segment that is communicated to the load balancer 13.

A repetition step 42 repeats all of the preceding steps for each data segment of the digital file requested unless the current data segment is the last data segment of the digital file in which case only the first processing step, the communication step and the termination step are repeated.

The synchronisation process 29 employed by the distributed digital file management method ensures that the digital file is retrieved in the correct order from the data storage servers 10 and that the temporal continuity between the digital file segments is respected. The client requests a digital file from the storage unit 4 and he receives a unified digital file in a continuous data stream from the storage unit 4.

A digital file writing request by a client 6 does not require the strict temporal continuity demanded by a digital file reading request. However, a synchronisation process similar to the above synchronisation process can be used to synchronise the writing of the digital file segments to the data storage servers 10. The processing step now communicates the digital segments to the data storage servers 10 for storage.

Due to the fact that the storage unit 4 comprises a plurality of internally interconnected data storage servers 10 having a local storage component 12 and a distributed digital file management method that has access to all information concerning all data storage servers 10, data communication to a client 6 that respects the strict temporal requirements of linear data communication is possible. The distributed digital file management additionally allows a unified storage unit to be presented to the client that simplifies the administration of the file system for the client.

In the current example the digital network is constructed using an Ethernet networking implementation. However in other embodiments of the invention, the digital network can be formed through the implementation of other network implementations such as for example an asynchronous transfer mode (ATM) network.

Additionally, the current embodiment has been described for the storage and communication of multimedia data. However, the network data storage system 2 according to the invention can equally be used for the communication and storage of all types of data such as information technology (IT) data.

In the current embodiment, it should be understood that the operations selected to be recorded in the storage management tables 20 by the distributed digital file management method and the operations that block the access to the digital file segments are given only as an example of an embodiment of the invention. In other embodiments of the invention different performances and availability for the network data storage system are obtained by selecting additional or fewer operations to be recorded in the storage management tables 20 and changing the operations that block the access to the digital file segments.

Additionally, access can be blocked at different levels and not only at a digital file segment level for example at the directory level.

What is claimed is:

1. A network data storage system comprising:
a storage unit for storing data and containing the data of at least one digital file;
at least one network client adapted to access the at least one digital file of the storage unit; and
an intermediate network switch adapted to form a liaison between the at least one network client and the storage unit;
the storage unit containing at least two data storage servers, where each data storage server comprises a local storage component containing digital file segments of the at least one digital file and each data storage server is adapted to execute a local digital file management method organizing the physical location of the digital file segments of the at least one digital file in the local storage component of the data storage server;
each data storage server is adapted to communicate with the other data storage servers within the storage unit and to execute a distributed digital file management method, the distributed digital file management method maintaining a record of operations concerning the digital file segments of each data storage server and communicating internally with the other data storage servers to exchange information concerning the digital file segments contained on the data storage servers and to obtain an overview of all information concerning all digital files stored on the storage unit;
wherein the intermediate network switch contains a load balancer, the load balancer being adapted to maintain an up to date record of the current and envisaged actions of each data storage server, to communicate a network client request to access the storage unit to one of the data storage servers, and to receive and communicate the digital file, comprising successive temporally synchronized data segments transferred which form a continuous stream of data for use in real-time from the at least two data storage servers, to the client following a digital file reading request;
wherein a current data storage server containing the digital file segment currently being transferred synchronizes its clock to the clock of a subsequent data storage server containing the next digital file segment after notification of a network frame number is sent from the current data storage server to the load balancer.

2. The network data storage system according to claim 1, wherein for implementing the distributed digital file management method, each data storage server has means for organizing data communication to the at least one network client and between the data storage servers and means for managing the logistical organization of the digital file segments of the at least one digital file on the data storage servers based on the overview of all information concerning all digital files stored on the storage unit.

3. The network data storage system according to claim 1, wherein each data storage server is adapted to communicate with the intermediate network switch and the network client has a unique virtual entry point to the storage unit; the distributed digital file management method of the data storage servers presenting the storage unit to the network client as a unified storage unit and concealing the data storage servers and the local storage components from the network client.

4. The network data storage system according to claim 1, wherein each data storage server is adapted, following a digital file writing request of the network client, to divide the at least one digital file into digital file segments and to communicate the digital file segments to the local storage component of at least two data storage servers for storage.

5. The network data storage system according to claim 2, wherein each data storage server is adapted, following a digital file writing request of the network client, to divide the at least one digital file into digital file segments and to communicate the digital file segments to the local storage component of at least two data storage servers for storage.

6. The network data storage system according to claim 3, wherein each data storage server is adapted, following a digital file writing request of the network client, to divide the at least one digital file into digital file segments and to communicate the digital file segments to the local storage component of at least two data storage servers for storage.

7. The network data storage system according to claim 1, wherein each data storage server is adapted, following a digital file reading request of the network client, to temporally synchronize the recuperation of each data segment of the at least one digital file from the local storage components to form a real time continuous stream of data segments, reconstructing the at least one digital file without data segment overlap or discontinuity.

8. The network data storage system according to claim 2, wherein each data storage server is adapted, following a digital file reading request of the network client, to temporally synchronize the recuperation of each data segment of the at least one digital file from the local storage components to form a real time continuous stream of data segments, reconstructing the at least one digital file without data segment overlap or discontinuity.

9. The network data storage system according to claim 3, wherein each data storage server is adapted, following a digital file reading request of the network client, to temporally synchronize the recuperation of each data segment of the at least one digital file from the local storage components to form a real time continuous stream of data segments, reconstructing the at least one digital file without data segment overlap or discontinuity.

10. The network data storage system according to claim 4, wherein each data storage server is adapted, following a digital file reading request of the network client, to temporally synchronize the recuperation of each data segment of the at least one digital file from the local storage components to form a real time continuous stream of data segments, reconstructing the at least one digital file without data segment overlap or discontinuity.

11. The network data storage system according to claim 5, wherein each data storage server is adapted, following a digital file reading request of the network client, to temporally synchronize the recuperation of each data segment of the at least one digital file from the local storage components to form a real time continuous stream of data segments, reconstructing the at least one digital file without data segment overlap or discontinuity.

12. The network data storage system according to claim 6, wherein each data storage server is adapted, following a digital file reading request of the network client, to temporally synchronize the recuperation of each data segment of the at least one digital file from the local storage components to form a real time continuous stream of data segments, reconstructing the at least one digital file without data segment overlap or discontinuity.

13. The network data storage system according to claim 1, wherein each local storage component is a redundant array of independent disks.

14. The network data storage system according to claim 1, wherein each local storage component is a hard disk drive.

15. The network data storage system according to claim 13, wherein each local storage component is a hard disk drive.

* * * * *